(12) United States Patent
Liang et al.

(10) Patent No.: US 9,063,706 B2
(45) Date of Patent: Jun. 23, 2015

(54) DATA STORAGE DEVICE MOUNTING APPARATUS

(75) Inventors: Wei-Kuang Liang, New Taipei (TW); Quan-Guang Du, Shenzhen (CN); Chun Tang, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 590 days.

(21) Appl. No.: 13/463,916

(22) Filed: May 4, 2012

(65) Prior Publication Data

US 2013/0050925 A1  Feb. 28, 2013

(30) Foreign Application Priority Data

Aug. 29, 2011  (CN) .......................... 2011 1 0250706

(51) Int. Cl.
*H05K 7/00* (2006.01)
*G06F 1/18* (2006.01)

(52) U.S. Cl.
CPC ...................................... *G06F 1/187* (2013.01)

(58) Field of Classification Search
CPC . G06F 1/187; G06F 2200/1633; G06F 1/183; G06F 1/1613; G06F 1/1658; G06F 1/1679; G06F 1/203; G06F 1/181; G06F 1/184; G06F 1/185; G06F 3/0689; H05K 7/1427

USPC ............ 361/679.33, 679.37, 679.39, 679.31, 361/679.3, 679.26, 679.09, 679.02, 679.01
See application file for complete search history.

(56) References Cited

U.S. PATENT DOCUMENTS

| | | | | |
|---|---|---|---|---|
| 5,579,204 A | * | 11/1996 | Nelson et al. ............ | 361/679.32 |
| 6,313,984 B1 | * | 11/2001 | Furay ....................... | 361/679.31 |
| 6,532,150 B2 | * | 3/2003 | Sivertsen et al. ........ | 361/679.33 |
| 6,831,831 B2 | * | 12/2004 | Bicknell et al. .......... | 361/679.33 |
| 8,014,144 B2 | * | 9/2011 | Cheng et al. ............. | 361/679.33 |

\* cited by examiner

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

A data storage device mounting apparatus includes a base, a securing member, and a cover engaged with the base. The base includes a receiving portion and a recess, the recess defines a through hole. The securing member is secured to a first data storage device and includes a securing piece. The securing piece defines a stopping hole. The cover is configured to cover a second data storage device. A stopping portion located on the cover. The receiving portion is adaptor to receive the first data storage device, the securing piece is received in the recess, and the stopping portion extends through the through hole to engage in the stopping hole, for preventing the first data storage device from disengaging from the receiving portion.

20 Claims, 9 Drawing Sheets

DATA STORAGE DEVICE MOUNTING APPARATUS

BACKGROUND

1. Technical Field

The present disclosure relates to mounting apparatuses, and particularly to a mounting apparatus for a data storage device.

2. Description of Related Art

Many data storage devices, such as hard disk drives, floppy disk drives, and optical drives are screwed to a drive bracket of a computer enclosure. However, the method of mounting data storage devices using screws is known to be labor-intensive and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
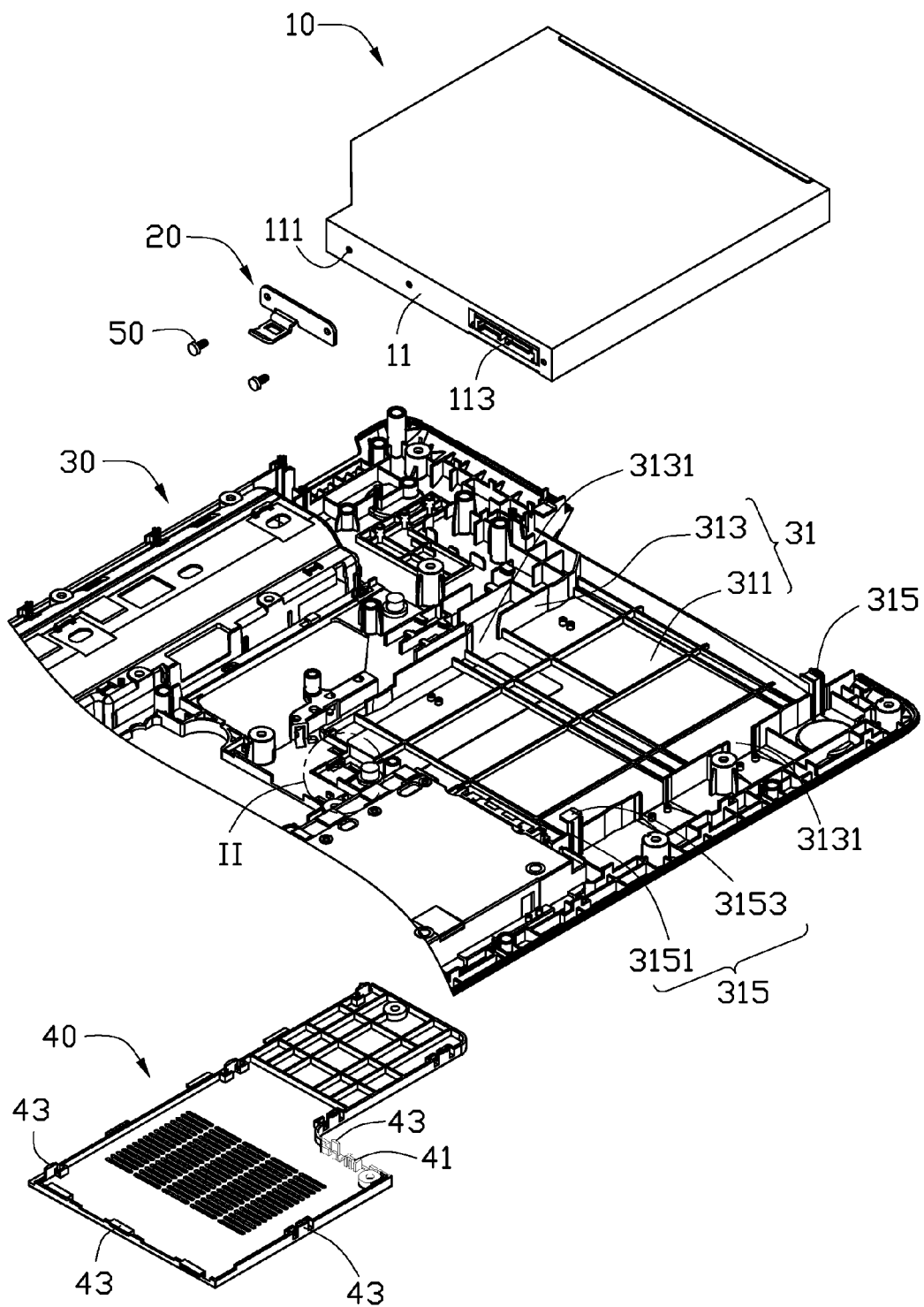
FIG. 1 is an exploded, isometric view of an embodiment of a first data storage device and a mounting apparatus, and a base of the mounting apparatus is partially shown.

Referring to FIG. 1, a mounting apparatus, for securing a first data storage device 10, includes a securing member 20, a base 30 and a cover board 40. In one embodiment, the first data storage device 10 may be a hard disk drive (HDD), a floppy disk drive and a compact disc-read only memory (CD-ROM) drive.

The first storage device 10 includes a sidewall 11. Two threaded holes 111 and a connecting hole 113 are defined in the sidewall 11.

Figure 3:
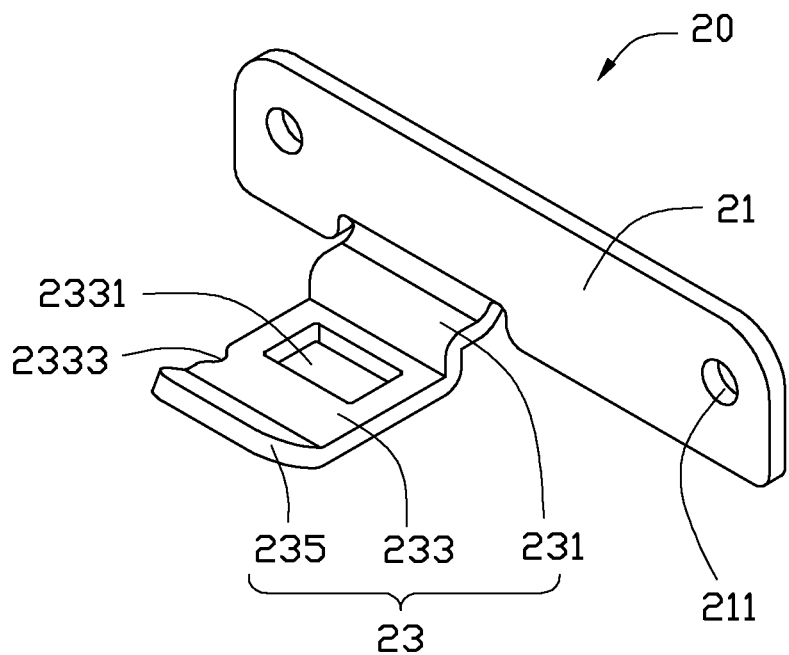
FIG. 3 is an exploded, isometric view of a securing member of the mounting apparatus of FIG. 1.

Referring to FIG. 3, the securing member 20 includes an installation piece 21 and a securing piece 23. Two installation holes 211 are defined in the installation piece 21. The securing piece 23 includes a connecting portion 231, a sliding portion 233 and a guiding portion 235. The connecting portion 231 extends from a bottom edge of the installation piece 21. The sliding portion 233 extends from a distal end of the connecting portion 231. In one embodiment, a plane defined by the sliding portion 233 is substantially perpendicular to the installation piece 21. A rectangular stopping hole 2331 is defined in the sliding portion 231. A cutout 2333 is defined in a sidewall of the sliding portion 233. The guiding portion 235 extends from a distal end of the sliding portion 233. In one embodiment, an obtuse angle is defined between the guiding portion 235 and the sliding portion 233.

Figure 2:
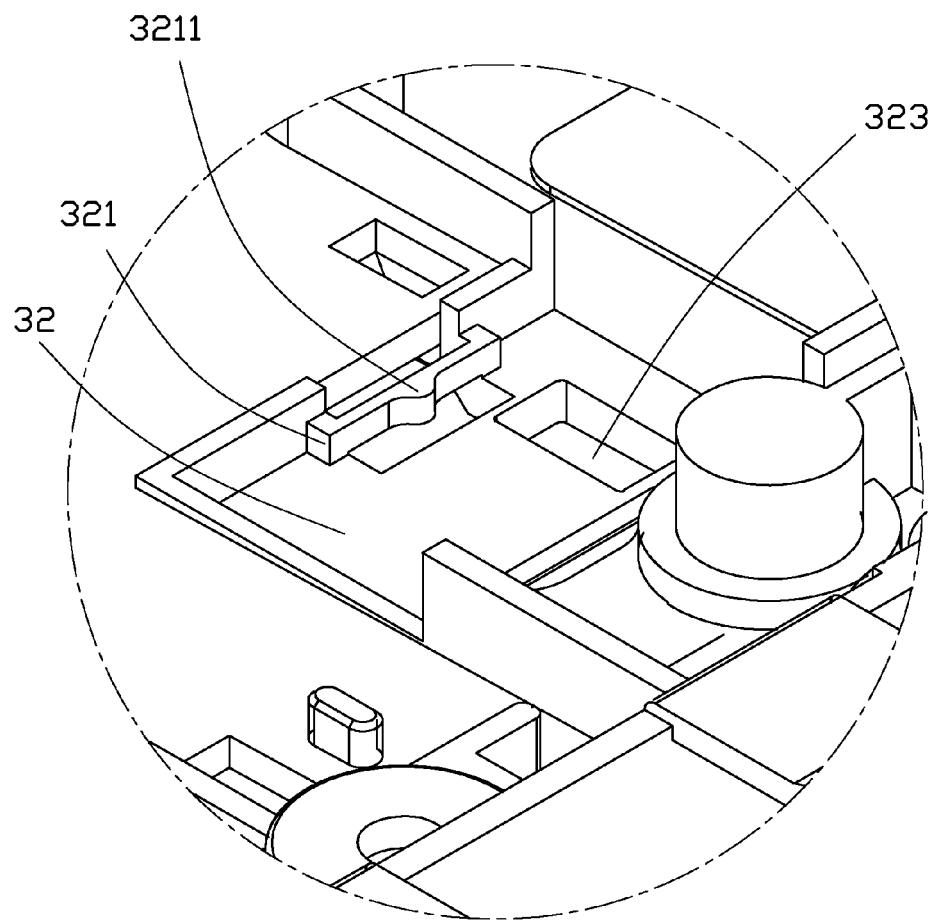
FIG. 2 is an enlarged view of the circled portion II of FIG. 1.

Referring to FIGS. 1-2, the base 30 includes a receiving portion 31, a recess 32 and a connector 33. The receiving portion 31 includes a bottom panel 311 and two positioning pieces 313. In one embodiment, the two positioning pieces 313 are parallel to each other and substantially perpendicular to the bottom panel 311. Each of the two positioning pieces 313 defines an opening 3131. Three hooks 315 are located on the bottom panel 311. Two of the three hooks 315 are placed at one of the two positioning pieces 313 adjacent to the connector 33. The other one of the three hooks 315 is placed at another one of the two positioning pieces 313. Each of the three hooks 315 includes a limiting portion 3151 and a pressing portion 3153 extending from the limiting portion 3151. In one embodiment, the three hooks 315 are arranged at three corners of a right triangle.

A resilient portion 321 is located on a sidewall of the recess 32. A latch portion 3211 extends inward from the resilient portion 321. The bottom of the recess 32 defines a through hole 323 throughout the base 30.

The cover board 40 is configured to cover a second storage device secured (not shown) to the base 30. In one embodiment, the second data storage device may be an HDD, a floppy disk drive and a CD-ROM drive. A stopping portion 41 and a plurality of fixing portions 43 are located on the cover board 40.

Figure 4:
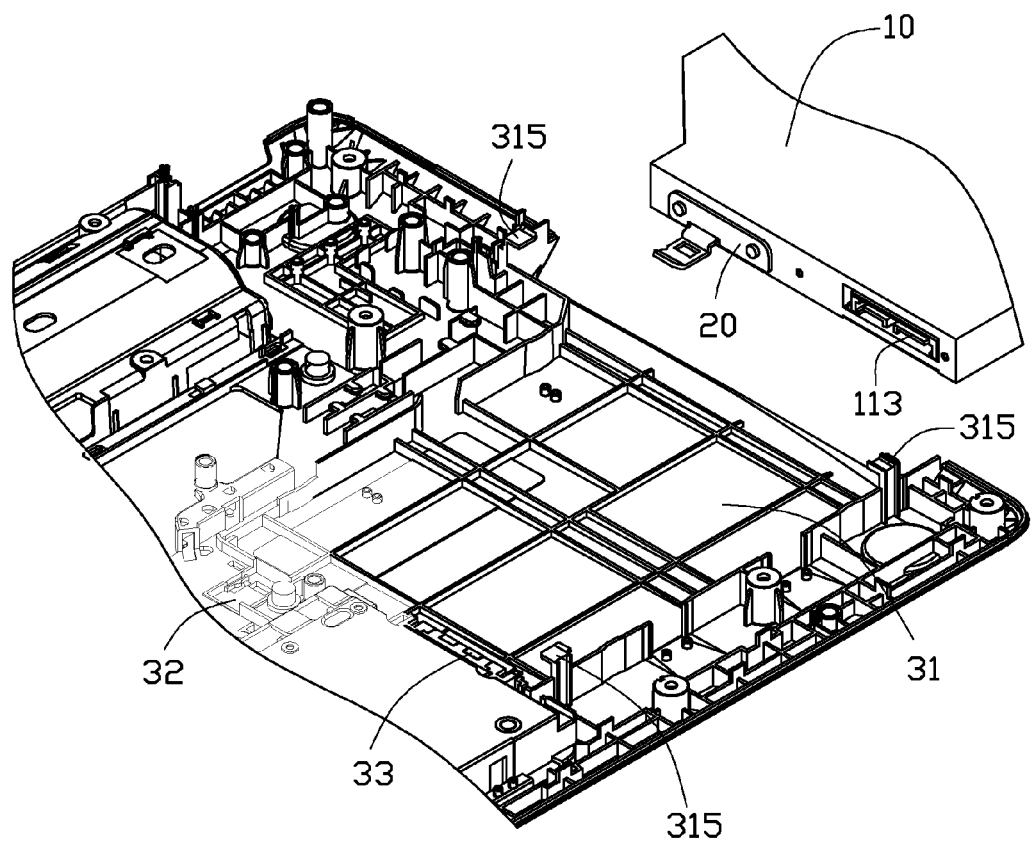
FIG. 4 is an assembled view of the base, the securing member and the first data storage device of FIG. 1.

Referring to FIG. 4, in assembly of the securing member 20 to the first data storage device 10, the installation piece 21 abuts on the sidewall 11, and each of the two installation holes 211 is aligned with each of the two threaded holes 111. Two fixing members 50 are respectively inserted into the two installation holes 211 and extend into the two threaded holes 111. Thus, the securing member 20 is thereby installed on the first data storage device 10.

Figure 5:
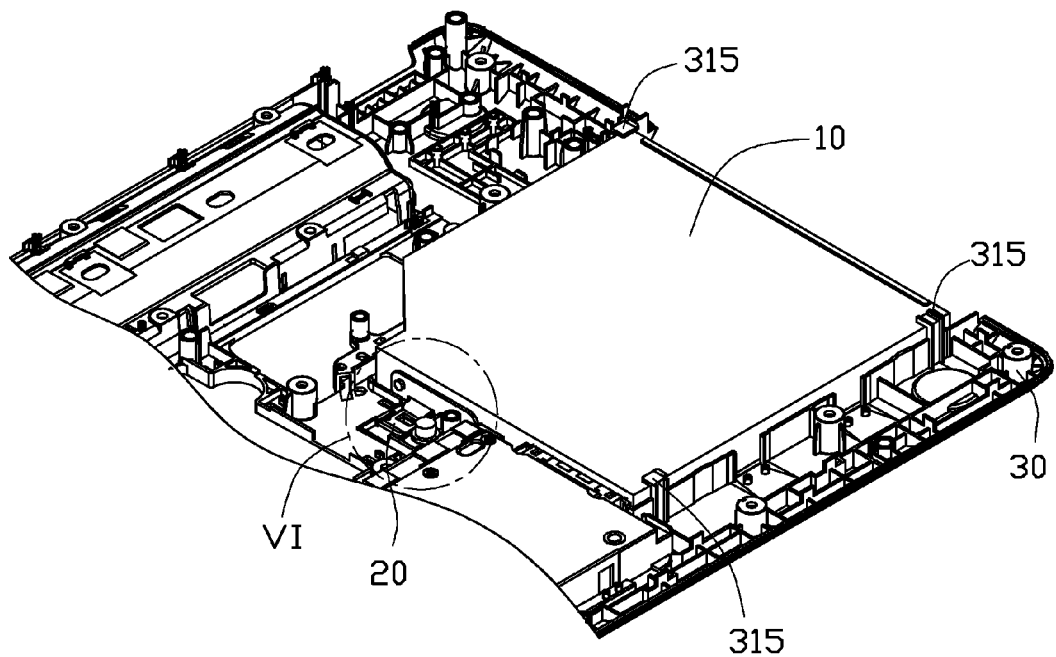
FIG. 5 is another assembled view of the base, the securing member and the first data storage device of FIG. 4.
Figure 6:
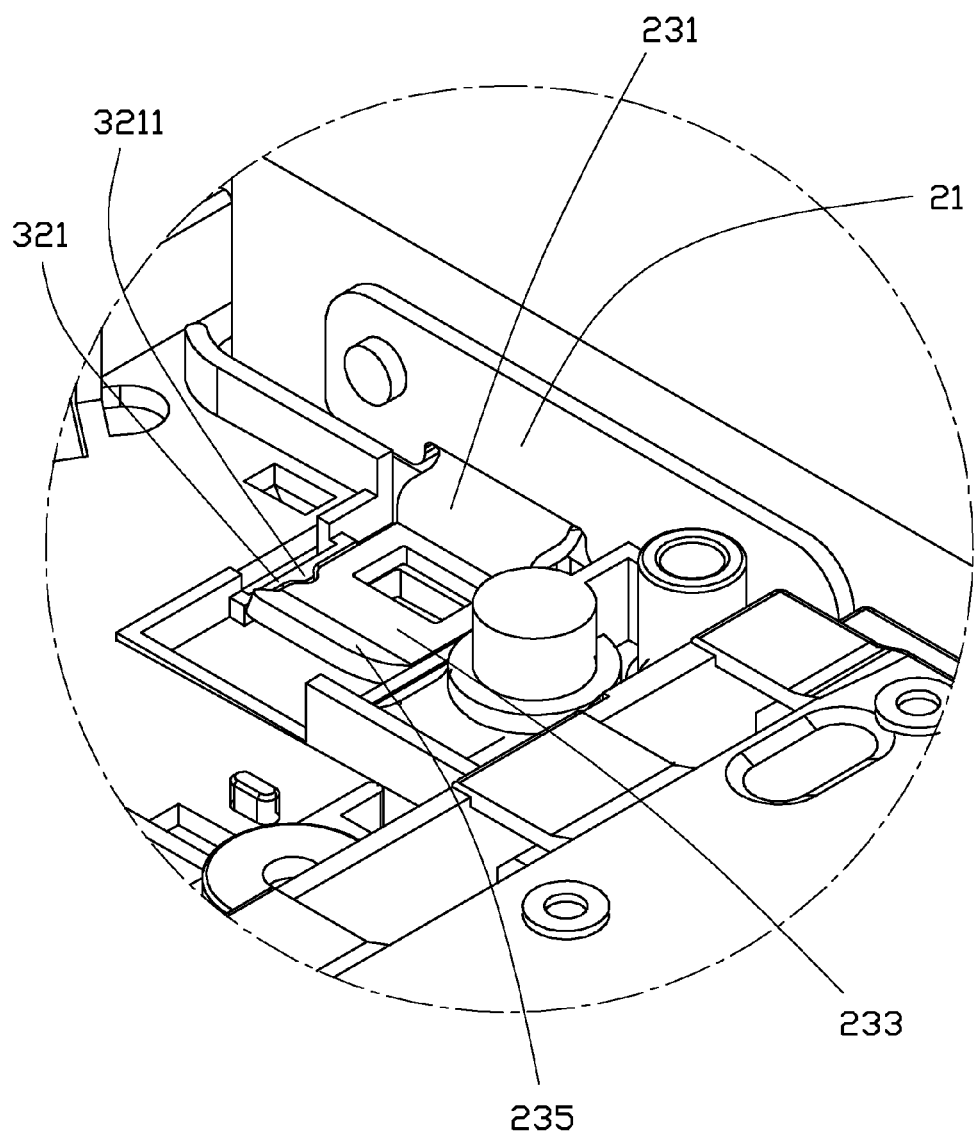
FIG. 6 is an enlarged view of the circled portion VI of FIG. 5.

Referring to FIGS. 5-6, in assembly, the first data storage device 10 is placed at one side of the receiving portion 31 and moved towards the receiving portion 31. The securing member 20 is moved towards the recess 32 to bias the resilient portion 321 to elastically deform, until the latch portion 3211 is aligned with the cutout 2333 to engage in the cutout 2333. The first data storage device 10 is received in the receiving portion 31. The pressing portions 3153 of the three hooks 315 abut the first data storage device 10 to prevent the first storage device 10 from moving along a direction perpendicular to the bottom panel 311. The connector 33 is inserted into the connecting hole 113.

Figure 7:
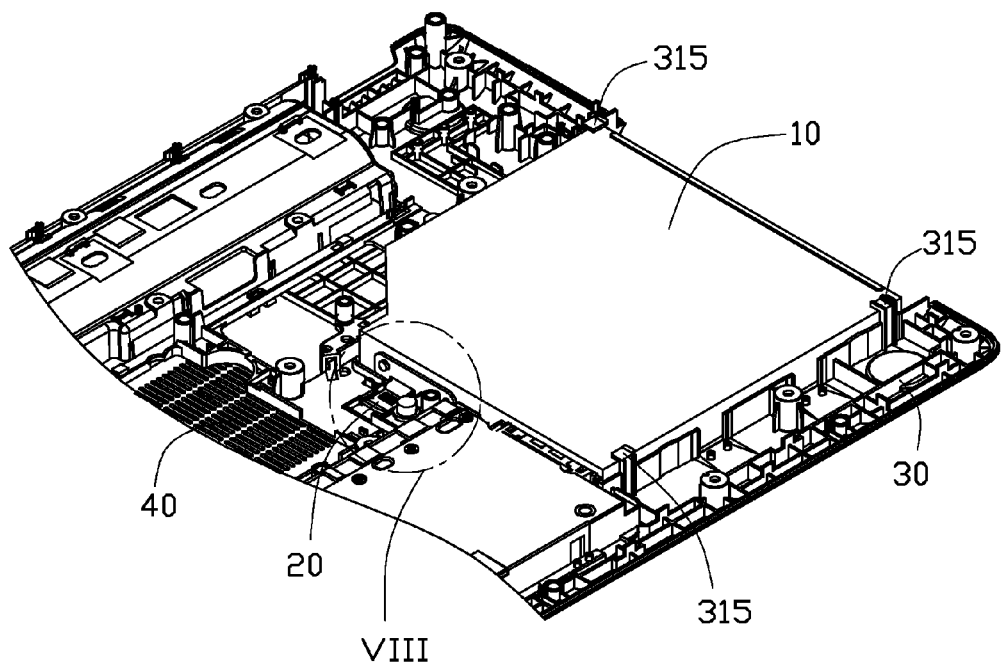
FIG. 7 is an assembled view of the first data storage device and the mounting apparatus of FIG. 1.
Figure 8:
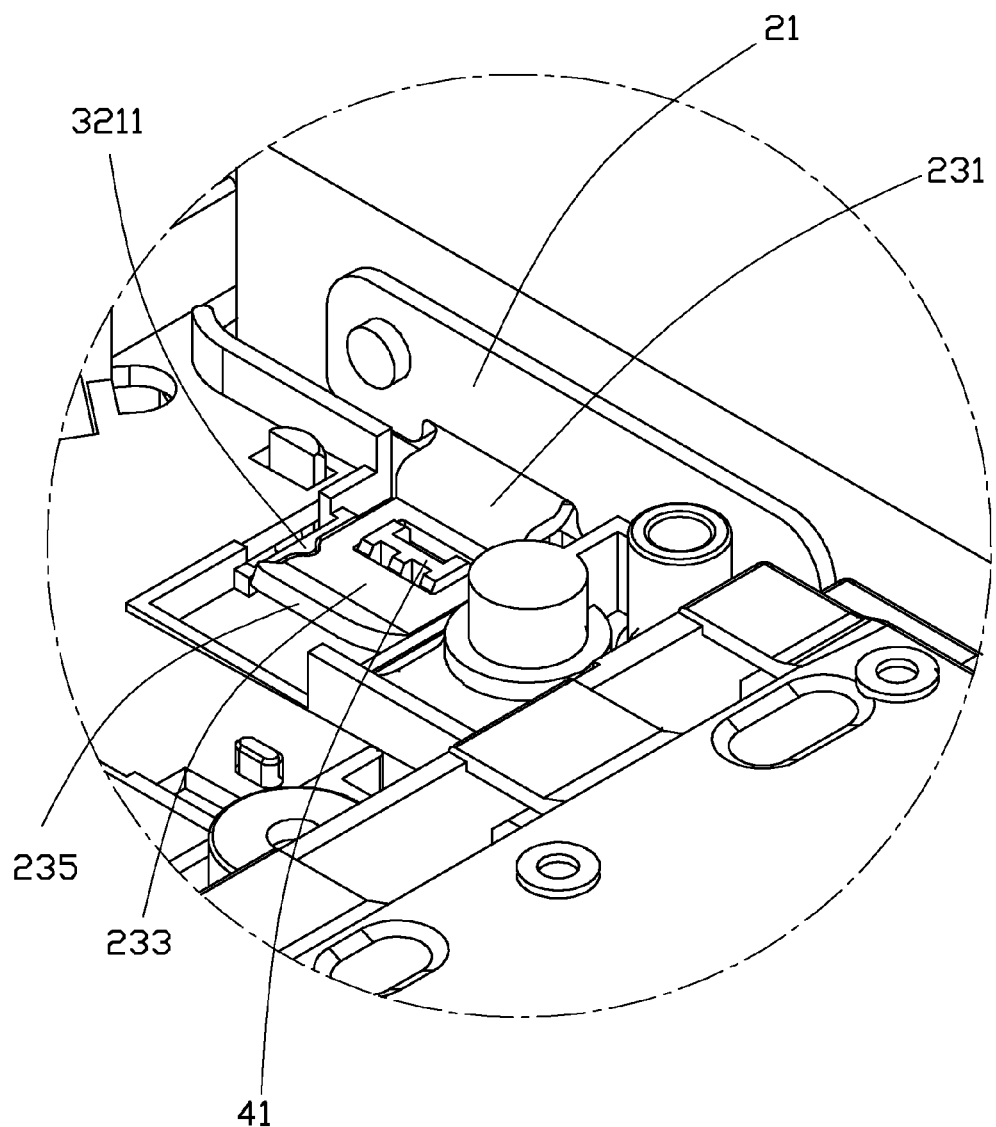
FIG. 8 is an enlarged view of the circled portion VIII of FIG. 7.
Figure 9:
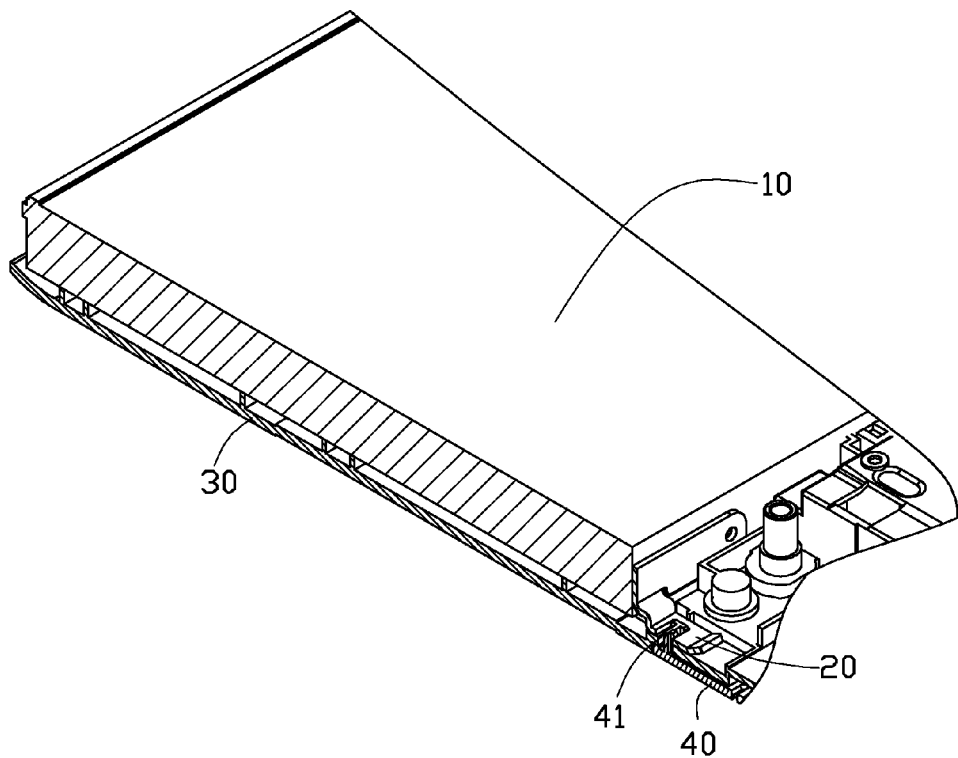
FIG. 9 is a cross-sectional view of the first data storage device and the mounting apparatus of FIG. 7.

Referring to FIGS. 7-9, in assembly of the cover board 40, the plurality of fixing portions 43 are engaged with the base 30. The stopping portion 41 extends through the through hole 323 to engage in the stopping hole 2331.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A data storage device mounting apparatus comprising:
   a base comprising a receiving portion and a recess, a through hole defined in the recess;
   a securing member secured to a first data storage device, the securing member comprising a securing piece, the securing piece defining a stopping hole;
   a cover engaged with the base, the cover comprising a stopping portion located on the cover; and
   wherein the receiving portion is configured to receive the first data storage device, the securing piece is received in the recess, and the stopping portion extends through the through hole to be engaged in the stopping hole so that the first data storage device is prevented from disengaging from the receiving portion.

2. The data storage device mounting apparatus of claim 1, wherein the receiving portion comprises a bottom panel and two positioning pieces are located on the bottom panel; the two positioning pieces are parallel to each other and substantially perpendicular to the bottom panel.

3. The data storage device mounting apparatus of claim 2, wherein three hooks are located on the bottom panel and the three hooks are arranged at three corners of a right triangle.

4. The data storage device mounting apparatus of claim 3, wherein each of the three hooks comprises a limiting portion and a pressing portion perpendicularly extending from the limiting portion, and the pressing portion abuts the first data storage device so that the first data storage device is prevented from moving along a direction perpendicularly to the bottom panel.

5. The data storage device mounting apparatus of claim 1, wherein the securing member further comprises an installation piece; and the installation piece is secured to a sidewall of the first data storage device.

6. The data storage device mounting apparatus of claim 5, wherein the securing piece comprises a connecting portion; and the connecting portion extends from a bottom edge of the installation piece.

7. The data storage device mounting apparatus of claim 6, wherein the securing piece further comprises a sliding portion extending from a distal end of the connecting portion, and a plane containing the sliding portion is substantially perpendicular to the installation piece.

8. The data storage device mounting apparatus of claim 7, wherein a cutout is defined in a sidewall of the sliding portion, a resilient portion is located on a sidewall of the recess of the base, the resilient portion is engaged in the cutout and is elastically deformable to disengage from the cutout.

9. The data storage device mounting apparatus of claim 8, wherein a latch portion extends inward from the resilient portion; and the latch portion is engaged in the cutout.

10. The data storage device mounting apparatus of claim 7, wherein the securing piece further comprises a guiding portion extending from a distal end of the sliding portion, and an obtuse angle is defined between the sliding portion and the guiding portion.

11. A data storage device mounting apparatus comprising:
    a base comprising a receiving portion and a recess, a resilient portion located in a sidewall of the recess;
    a securing member secured to a first data storage device, the securing member comprising a securing piece, the securing piece defining a cutout; and
    wherein the receiving portion is configured to receive the first data storage device, the resilient portion is engaged in the cutout so that the first data storage device is prevented from moving away the receiving portion, and the resilient portion is elastically deformable to disengage from the cutout.

12. The data storage device mounting apparatus of claim 11, wherein the receiving portion comprises a bottom panel and two securing pieces are located on the bottom panel; the two securing pieces are parallel to each other and substantially perpendicular to the bottom panel.

13. The data storage device mounting apparatus of claim 12, wherein three hooks are located on the bottom panel; and the three hooks are arranged at three corners of a right triangle.

14. The data storage device mounting apparatus of claim 13, wherein each of the three hooks comprises a limiting portion and a pressing portion perpendicularly extending from the limiting portion, and the pressing portion abuts the first data storage device so that the first data storage device is prevented from moving along a first direction perpendicularly to the bottom panel.

15. The data storage device mounting apparatus of claim 11, wherein the securing member further comprises an installation piece; and the installation piece is secured to a sidewall of the first data storage device.

16. The data storage device mounting apparatus of claim 15, wherein the securing piece comprises a connecting portion and the connecting portion extends from a bottom edge of the installation piece.

17. The data storage device mounting apparatus of claim 16, wherein the securing piece further comprises a sliding portion extending from a distal of the connecting portion, and a plane containing the sliding portion is substantially perpendicular to the installation piece.

18. The data storage device mounting apparatus of claim 17, wherein the securing piece further comprises a guiding portion extending from a distal end of the sliding portion, and an obtuse angle is defined between the sliding portion and the guiding portion.

19. The data storage device mounting apparatus of claim 11, wherein a latch portion extends inwards from the resilient portion; and the latch portion is engaged in the cutout.

20. The data storage device mounting apparatus of claim 11 further comprises a cover configured to cover a second data storage device, the cover comprising a stopping portion located on the cover, a through hole being defined in the recess of the base, the securing piece defining a stopping hole, wherein the cover is engaged with the base, and the stopping portion extends through the through hole to engage in the stopping hole.

* * * * *